United States Patent
Hsu

Patent Number: 5,780,161
Date of Patent: Jul. 14, 1998

[54] NON-ABSORBING ANTI-REFLECTIVE COATED (ARC) RETICLE USING THIN DIELECTRIC FILMS AND METHOD OF FORMING THE RETICLE

[75] Inventor: Sung-Mu Hsu, Lotung, Taiwan

[73] Assignee: Taiwan Semiconductor Manufacturing Company Ltd., Hsin-Chu, Taiwan

[21] Appl. No.: 746,059

[22] Filed: Nov. 6, 1996

[51] Int. Cl.$^6$ ............................... B32B 17/06; C03C 17/34
[52] U.S. Cl. .................. 428/426; 428/433; 428/469; 428/698; 428/702; 65/60.2; 65/60.4; 65/60.5; 65/60.8; 65/DIG. 8; 430/5
[58] Field of Search .................. 430/5; 428/209, 428/210, 426, 433, 469, 698, 702; 65/60.2, 60.4, 60.5, 60.7, 60.8, DIG. 8; 427/164, 165

[56] References Cited

U.S. PATENT DOCUMENTS

| | | | |
|---|---|---|---|
| 4,557,797 | 12/1985 | Fuller et al. | 156/643 |
| 5,194,345 | 3/1993 | Rolfson | 430/5 |
| 5,292,623 | 3/1994 | Kemp et al. | 430/5 |
| 5,328,786 | 7/1994 | Miyazaki et al. | 430/5 |
| 5,354,632 | 10/1994 | Dao et al. | 430/5 |
| 5,372,901 | 12/1994 | Rolfson et al. | 430/5 |
| 5,460,908 | 10/1995 | Reinberg | 430/5 |
| 5,589,305 | 12/1996 | Tomofuji et al. | 430/5 |
| 5,609,977 | 3/1997 | Iwamatsu et al. | 430/5 |
| 5,614,336 | 3/1997 | Mikami et al. | 430/5 |

OTHER PUBLICATIONS

S. Wolf et al. "Silicon Processing in the VLSI Era–vol. 1" Lattice Press, Sunset Beach, CA, p. 441, 1986.

*Primary Examiner*—Steven P. Griffin
*Attorney, Agent, or Firm*—George O. Saile; Stephen B. Ackerman; Alek P. Szecsy

[57] ABSTRACT

An anti-reflective reticle and a method by which the anti-reflective reticle is formed. Formed upon a first surface of a transparent substrate is a patterned metal layer. Formed upon at least one of: (1) the first surface of the transparent substrate including the patterned metal layer; or (2) the surface of the transparent substrate opposite the patterned metal layer is a two-layer dielectric stack. The two layer dielectric stack has a first dielectric layer which is closer to the transparent substrate and a second dielectric layer which is formed directly upon the first dielectric layer. The first dielectric layer has an index of refraction greater than the index of refraction of the transparent substrate or the second dielectric layer. The second dielectric layer has a thickness of about one-quarter the wavelength of reflected light desired to be attenuated or eliminated from the surface of the reticle.

16 Claims, 2 Drawing Sheets

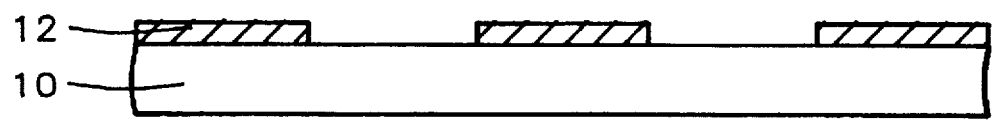
*FIG. 1 - Prior Art*
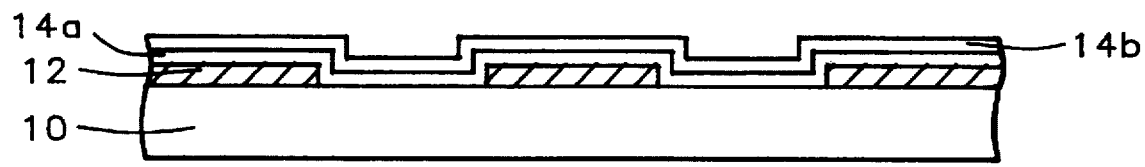
*FIG. 2*
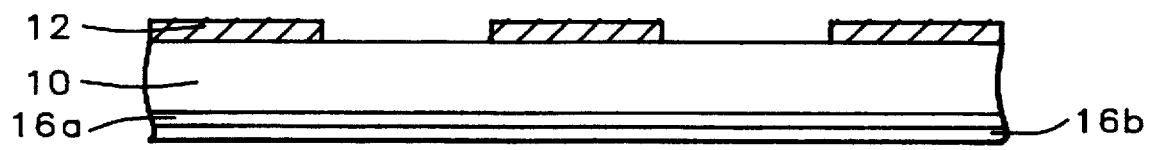
*FIG. 3*
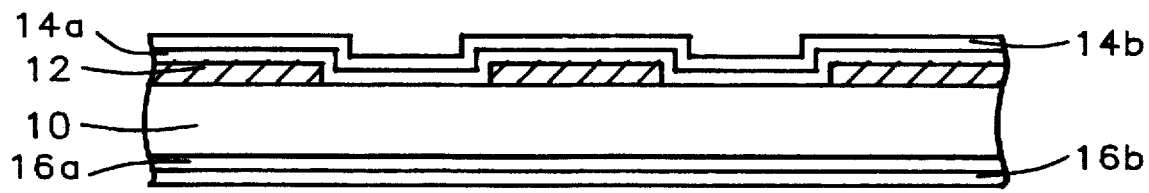
*FIG. 4*

NON-ABSORBING ANTI-REFLECTIVE COATED (ARC) RETICLE USING THIN DIELECTRIC FILMS AND METHOD OF FORMING THE RETICLE

BACKGROUND OF THE INVENTION

1. Field of the Invention

The present invention relates generally to reticles employed in photo-lithographically patterning semiconductor substrates. More particularly, the present invention relates to non-absorbing anti-reflective reticles employed in photo-lithographically patterning semiconductor substrates.

2. Description of the Related Art

Conventional in the art of integrated circuit manufacture is the use of reticles which are employed with coherent light sources to print upon the surfaces of semiconductor substrates fine line-width features of integrated circuit devices and conductor elements. Such reticles are typically fabricated from a transparent substrate having formed thereupon a patterned metal layer which defines the integrated circuit device and/or conductor element features to be printed.

Although the optical characteristics of coherent light passing through conventional reticles are typically well defined and understood, occurrences occasionally arise in semiconductor substrate manufacturing processes employing those conventional reticles wherein coherent light reflections from surfaces of those conventional reticles are undesirable. Such occurrences may include, but are not limited to: (1) coherent light reflections which impede proper alignment of reticles within semiconductor substrate photo-exposure tooling, and (2) coherent light reflections which impede proper patterning of photo-active layers which are patterned through use of those conventional reticles. The present invention is directed towards the goal of providing for use within semiconductor substrate photo-patterning processes and photo-exposure tooling reticles from whose surfaces there is attenuated or eliminated undesirable light reflections.

The use of anti-reflective coatings (ARCs) to attenuate or eliminate undesirable coherent light reflections from the surfaces of reflective semiconductor substrates desired to be patterned through photo-lithographic processes has been disclosed in the art. Such anti-reflective coatings (ARCs) are typically formulated from organic polymer compositions into which there has been incorporated a dye which absorbs strongly at the coherent light wavelength at which light attenuation or elimination is desired. Such anti-reflective coatings (ARCs) may alternatively be formed either: (1) directly upon a reflective semiconductor substrate and beneath a photo-active composition which is employed to pattern that reflective semiconductor substrate, or (2) as a discrete layer within a multi-layer stack of photo-active compositions formed upon a reflective semiconductor substrate for the purpose of patterning that reflective semiconductor substrate.

For example, Wolf et al., in "Silicon Processing for the VLSI Era," Vol. 1: Process Technology, (Lattice Press: 1986) pg 441 discloses the use of an anti-reflective coating (ARC) beneath a photoresist layer and directly upon a reflective semiconductor substrate when fabricating an integrated circuit upon the reflective semiconductor substrate. In addition, Fuller et al., in U.S. Pat. No. 4,557,797 discloses an anti-reflective coating (ARC) between the two layers of a bi-layer photoresist structure employed to pattern a metal layer which forms a reflective semiconductor substrate of significant topography. The disclosed method provides an integrated circuit processing method operable upon non-planar reflective semiconductor substrate topography with minimal additional processing steps and expense.

Desirable in the art is a method whereby undesirable reflections from reticles may analogously be attenuated or eliminated in order to assure optimal processing of semiconductor substrates upon whose surfaces are printed integrated circuit device features and conductor element features through use of those reticles.

SUMMARY OF THE INVENTION

An object of the present invention is to provide a reticle through which integrated circuit device features and conductor element features may be printed upon semiconductor substrates, which reticle has attenuated or eliminated from its surfaces undesirable light reflections.

A second object of the present invention is to provide a reticle in accord with the first object of the present invention, which reticle is also readily manufacturable.

In accord with the objects of the present invention, a reticle for use in patterning upon semiconductor substrates integrated circuit device features and conductor element features is disclosed, along with the method by which that reticle may be manufactured. To fabricate the reticle of the present invention, there is first provided a transparent substrate which has a first surface and a second surface. The first surface and the second surface are on opposite sides of the transparent substrate. Formed upon the first surface of the transparent substrate is a patterned metal layer. There is then formed upon at least one of: (1) the first surface of the transparent substrate including the patterned metal layer; and (2) the second surface of the transparent substrate, a two-layer dielectric stack comprised of a first dielectric layer formed closer to the transparent substrate and a second dielectric layer formed directly upon the first dielectric layer. The first dielectric layer has an index of refraction greater than the index of refraction of either the transparent substrate or the second dielectric layer. The second dielectric layer has a thickness of about one-quarter the wavelength of light desired to be attenuated when the reticle is employed in printing upon a semiconductor substrate integrated circuit device features and conductor element features.

The reticle of the present invention has limited susceptibility to reflections from its surface when the reticle of the present invention is employed in printing upon a semiconductor substrate integrated circuit device features and conductor element features. By forming upon at least one surface of the reticle of the present invention the two-layer dielectric stack, where: (1) the first dielectric layer within the two layer dielectric stack has an index of refraction greater than the index of refraction of either the transparent substrate or the second dielectric layer; and (2) the second dielectric layer within the two-layer dielectric stack has a thickness about one-quarter the wavelength of light whose reflection is desired to be attenuated from the reticle of the present invention, there is formed a reticle from whose surface is attenuated or eliminated reflected light.

The reticle of the present invention is readily manufacturable. The reticle of the present invention is manufactured through forming upon at least one surface of a conventional reticle construction a two-layer dielectric stack. Methods and materials through which dielectric layers within multi-layer dielectric stacks may be successively formed upon surfaces such as semiconductor substrate surfaces and reticle surfaces are known in the art. Such methods and materials provide readily manufacturable processes.

BRIEF DESCRIPTION OF THE DRAWINGS

The objects features and advantages of the present invention are understood within the context of the Description of the Preferred Embodiments, as set forth below. The Description of the Preferred Embodiments is understood within the context of the accompanying drawings, which form a material part of this disclosure, wherein:

FIG. 1 shows a cross-sectional schematic diagram illustrating a conventional reticle upon which may be practiced the present invention.

FIG. 2 shows a cross-sectional schematic diagram illustrating a reticle formed in accord with the first preferred embodiment of the present invention.

FIG. 3 shows a cross-sectional schematic diagram illustrating a reticle formed in accord with the second preferred embodiment of the present invention.

FIG. 4 shows a cross-sectional schematic diagram illustrating a reticle formed in accord with the third preferred embodiment of the present invention.

DESCRIPTION OF THE PREFERRED EMBODIMENTS

Figure 5:
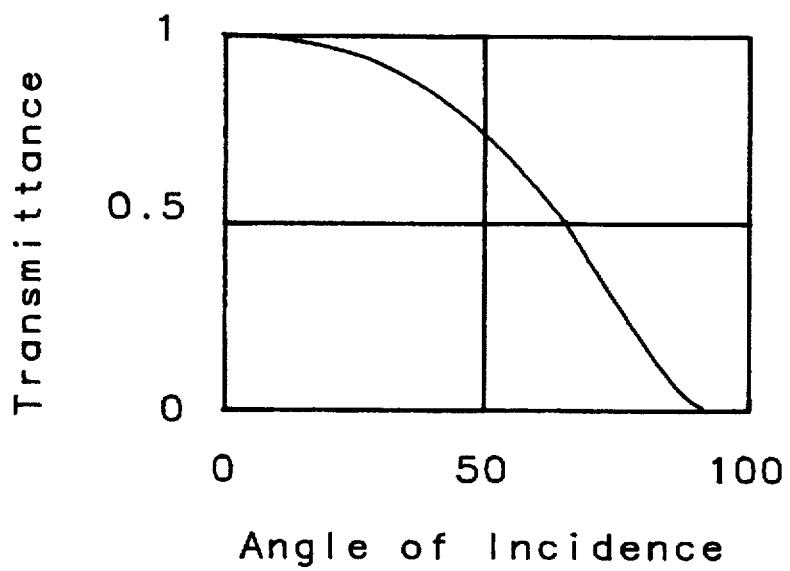
FIG. 5 shows a plot of Transmittance versus Angle of Incidence calculated for a reticle formed in accord with the first preferred embodiment of the present invention.

The present invention provides a reticle which is employed, along with coherent light, in forming upon a semiconductor substrate integrated circuit device features and conductor element features. The reticle of the present invention attenuates or eliminates undesirable light reflections from at least one of its surfaces. The method by which undesirable light reflections are attenuated or eliminated from the surface(s) of the reticle of the present invention employs a two-layer dielectric stack formed upon at least either the surface of the reticle having a patterned metal layer formed thereupon or the surface of the reticle opposite the surface of the reticle having the patterned metal layer formed thereupon. Within the two-layer dielectric stack, the first dielectric layer, which is closer to the transparent substrate from which the reticle is formed, has an index of refraction greater than the index of refraction of either the transparent substrate or the second dielectric layer. In addition, the second dielectric layer has a thickness of about one-quarter the wavelength of light whose reflection is desired to be attenuated or eliminated from the surface of the reticle of the present invention.

The method of the present invention has broad applicability in forming reticles for use within integrated circuit manufacturing, from whose reticle surfaces reflected light may be attenuated or eliminated. The method of the present invention may be employed in forming low light reflectivity reticles for use in patterning integrated circuits including but not limited to dynamic random access memory (DRAM) integrated circuits, static random access memory (SRAM) integrated circuits, application specific integrated circuits (ASICs), integrated circuits having within their fabrications field effect transistors (FETs), integrated circuits having within their fabrications bipolar transistors and integrated circuits having within their fabrications bipolar complementary metal oxide semiconductor (BiCMOS) transistors. The method of the present invention has broad applicability in forming low reflectivity reticles which in turn may be employed in forming integrated circuit device and conductor element features.

Referring now to FIG. 1 there is shown a cross-sectional schematic diagram illustrating a conventional reticle from which in turn there may be formed the preferred embodiments of the low light reflectivity reticle of the present invention. Shown in FIG. 1 is a transparent substrate 10 upon which is formed a patterned metal layer 12. For the preferred embodiments of the present invention, the transparent substrate 10 is preferably structurally rigid and at least substantially transparent to the wavelength of light which is employed in printing the features of the patterned metal layer 12 upon a semiconductor substrate (the semiconductor substrate is not shown in FIG. 1). Thus, although several materials may be employed in forming the transparent substrate 10, the transparent substrate 10 is preferably formed of a glass having a high light transmission at the wavelength employed in printing the features of the patterned metal layer 12 upon a semiconductor substrate. For the preferred embodiments of the present invention, the transparent substrate 10 is preferably formed of a fused quartz glass. Preferably, the fused quartz glass from which is formed the transparent substrate is from about 2 to about 2.5 millimeters thick.

The patterned metal layer 12 which is formed upon the transparent substrate 10 may be formed of any metal which is conventionally employed in forming patterned metal layers upon transparent substrates for use in forming conventional reticles. Methods and materials through which may be formed such patterned metal layers for use in reticles are known in the art. Such patterned metal layers are typically formed through patterning through methods as are conventional in the art of blanket metal layers. Appropriate blanket metal layers may be formed through deposition methods including but not limited to thermal deposition methods, electron beam assisted deposition methods, chemical vapor deposition (CVD) methods and physical vapor deposition (PVD) sputtering methods. Typical metals from which may be formed blanket metal layers from which in turn may be formed patterned metal layers include but are not limited to tungsten, titanium and chromium.

For the conventional reticle of FIG. 1 from which is formed the low light reflectivity reticles of the preferred embodiments of the present invention, the patterned metal layer 12 is preferably formed of chromium, as is most common in the art. Preferably, the thickness of the metal features within the patterned metal layer 12 is from about 500 to about 1000 angstroms.

Referring now to FIG. 2 there is shown a cross-sectional schematic diagram illustrating the conventional reticle of FIG. 1 upon which has been formed a first two-layer dielectric stack comprised of a first dielectric layer 14a and a second dielectric layer 14b. The reticle as illustrated in FIG. 2 represents the first preferred embodiment of the low light reflectivity reticle of the present invention. Within FIG. 2, there are several primary parameters to which the first dielectric layer 14a and the second dielectric layer 14b are preferably designed and fabricated in order to provide an operational reticle while simultaneously assuring optimal attenuation or elimination of reflected light by the low light reflectivity reticle of the first preferred embodiment of the present invention.

Of the several primary parameters, the first primary parameter is that the first dielectric layer 14a and the second dielectric layer 14b are both preferably substantially transparent to the wavelength of light employed in patterning upon semiconductor substrates through the low light reflectance reticle of the first preferred embodiment of the present invention integrated circuit device and conductor element features. The second primary parameter is the comparative indices of refraction of the transparent substrate 10, the first dielectric layer 14a and the second dielectric layer 14b. For the first preferred embodiment of the low light reflectivity reticle of the present invention, it is preferred that the index of refraction of the first dielectric layer 14a is greater than either the index of refraction of the transparent substrate 10 or the index of refraction of the second dielectric layer 14b.

Thus, although several dielectric materials may in general be employed in forming dielectric layers upon reticles, including but not limited to dielectric materials such as silicon oxide dielectric materials, silicon nitride dielectric materials and silicon oxynitride dielectric materials, the specific choices of dielectric materials for the first dielectric layer 14a and the second dielectric layer 14b will be somewhat more limited. Nonetheless, the methods through which the first dielectric layer 14a and the second dielectric layer 14b may be formed are conventional to the art and include but are not limited to chemical vapor deposition (CVD) methods, plasma enhanced chemical vapor deposition (PECVD) methods and physical vapor deposition (PVD) sputtering methods.

For the first preferred embodiment of the low light reflectivity reticle of the present invention, the first dielectric layer 14a is preferably formed of a silicon nitride having an index of refraction of from about 2.0 to about 2.2 and the second dielectric layer 14b is preferably formed of a silicon oxide having an index of refraction of from about 1.4 to about 1.5. When employing a silicon oxide for forming the second dielectric layer 14b, the second dielectric layer 14b and the transparent substrate 10 will typically have similar indices of refraction, since the index of refraction of fused quartz from which is formed the transparent substrate is typically from about 1.6 to about 1.7, most typically about 1.64. The silicon nitride from which is formed the first dielectric layer 14a and the silicon oxide from which is formed the second dielectric layer 14b may both be deposited through methods as are conventional in the art.

A third primary parameter to which the first dielectric layer 14a and the second dielectric layer 14b are fabricated is the thicknesses to which the first dielectric layer 14a and the second dielectric layer 14b are preferably formed. To ensure optimal attenuation or elimination of light reflected from the surface of the low light reflectivity reticle of the first preferred embodiment of the present invention, it is preferred that the second dielectric layer 14b has a thickness of about one-quarter the wavelength of light whose reflectance is desired to be attenuated or eliminated from the surface of the low light reflectivity reticle of the first preferred embodiment of the present invention. Optionally, the second dielectric layer 14b may alternatively have a thickness equal to an integral number of the wavelength of light desired to be attenuated plus one quarter the wavelength of light desired to be attenuated (ie: alternate thickness=(n×wavelength)+¼ (wavelength), where n=1,2,3, etc.). Within the preferred embodiments of the present invention, the thickness of the first dielectric layer 14a is somewhat less significant than the thickness of the second dielectric layer 14b. The thickness of the first dielectric layer 14a may under certain circumstances be limited by the light absorption characteristics of the first dielectric layer 14a. Preferably, the thickness of the first dielectric layer 14a is from about 150 to about 230 angstroms, more preferably, from about 170 to about 210 angstroms.

Light whose reflectance it is desired to attenuate or eliminate from the low light reflectivity reticle of the first preferred embodiment of the present invention may impinge upon the low light reflectivity reticle through several light sources, including but not limited to: (1) photolithographic exposure light sources in the near ultra-violet (NUV) (ie: 365 nm) and the deep ultra-violet (DUV) (ie: 248 nm) wavelength regions; (2) photolithographic alignment light sources employing helium-neon laser light at about 623 nm; and (3) spurious light sources. Thus, different thicknesses of the second dielectric layer 14b will correspond to about one-quarter the wavelength of light whose reflection is desired to be attenuated from first preferred embodiment of the reticle of the present invention.

Most commonly, the light whose reflection it is desired to attenuate from the surface of the low light reflectivity reticle of the first preferred embodiment of the present invention will be photolithographic exposure light. For purposes of attenuating or eliminating reflected photolithographic exposure light in the near ultra-violet (NUV) (ie: 365 nm) wavelength region, the second dielectric layer 14b will preferably have a thickness of about 700 to about 1100 angstroms. For purposes of attenuating or eliminating reflected photolithographic exposure light in the deep ultra-violet (DUV) (ie: 248 nm) wavelength region, the second dielectric layer 14b will preferably have a thickness of about 500 to about 750 angstroms.

Upon forming the first dielectric layer 14a and the second dielectric layer 14b upon the surface of the patterned metal layer 12 of the conventional reticle, there is formed the low light reflectivity reticle of the first preferred embodiment of the present invention. The low light reflectivity reticle of the first preferred embodiment of the present invention attenuates or eliminates light reflections from the patterned metal surface of the low light reflectivity reticle of the first preferred embodiment of the present invention.

Referring now to FIG. 3, there is shown a schematic cross-sectional diagram of a reticle which comprises the second preferred embodiment of the present invention. Shown in FIG. 2 is the same transparent substrate 10 and patterned metal layer 12 of the conventional reticle which is illustrated in FIG. 1. However, the first two-layer dielectric stack which is comprised of the first dielectric layer 14a and the second dielectric layer 14b formed upon the patterned metal layer 12, as illustrated in FIG. 2, has been eliminated. Instead, the first two-layer dielectric stack has been replaced by a second two-layer dielectric stack which is comprised of a third dielectric layer 16a and a fourth dielectric layer 16b. The third dielectric layer 16a and the fourth dielectric layer 16b are formed upon the surface of the conventional reticle opposite the surface of the conventional reticle upon which is formed the patterned metal layer 12.

The primary and alternate parameters to which the third dielectric layer 16a is formed correspond to the primary and alternate parameters to which the first dielectric layer 14a is formed. The primary and alternate parameters to which the fourth dielectric layer 16b is formed correspond to the primary and alternate parameters to which the second dielectric layer 14b is formed. Specifically, the third dielectric layer 16a is preferably formed from a silicon nitride having an index of refraction greater than the index of refraction of either the fourth dielectric layer 16b or the transparent substrate 10. The fourth dielectric layer 16b is preferably formed of a silicon oxide having an index of refraction typically approximately equal or somewhat lower than the index of refraction of the transparent substrate 10. The fourth dielectric layer 16b preferably has a thickness of about one-quarter the wavelength of light desired to be attenuated from the surface of the low light reflectivity reticle of the second preferred embodiment of the present invention.

Upon forming the third dielectric layer 16a and the fourth dielectric layer 16b upon the surface of the conventional reticle opposite the surface of the conventional reticle having the patterned metal layer 12 formed thereupon, there is formed the low light reflectivity reticle of the second preferred embodiment of the present invention. The low light reflectivity reticle of the second preferred embodiment of the present invention attenuates or eliminates light reflections from the surface of the low light reflectivity reticle of the second preferred embodiment of the present invention opposite the surface upon which is formed the patterned metal layer 12.

Referring now to FIG. 4, there is shown a schematic cross-sectional diagram of a reticle which forms the third preferred embodiment of the present invention. Shown in FIG. 4 is the conventional reticle as shown in FIG. 1 upon which conventional reticle there is formed a first dielectric layer 14a, a second dielectric layer 14b, a third dielectric layer 16a and a fourth dielectric layer 16b. The preferred and alternative locations, compositions, indices of refraction and thicknesses of the first dielectric layer 14a, the second dielectric layer 14b, the third dielectric layer 16a and the fourth dielectric layer 16b correspond to the preferred and alternative values of those parameters disclosed for the equivalently referenced layers in the first preferred embodiment of the present invention as shown in FIG. 2 and the second preferred embodiment of the present invention as shown in FIG. 3.

Within the third preferred embodiment of the present invention, it is not required that the first dielectric layer 14a and the second dielectric layer 14b have the same thicknesses as the corresponding third dielectric layer 16a and the corresponding fourth dielectric layer 16b. The thicknesses of the first dielectric layer 14a and the second dielectric layer 14b within the first two-layer dielectric stack, and the third dielectric layer 16a and the fourth dielectric layer 16b within the second two-layer dielectric stack may be adjusted to optimize attenuation of reflection of different wavelengths of light from the surface of the reticle of the third preferred embodiment upon which is formed the patterned metal layer 12 and the surface of the reticle of the third preferred embodiment of the present invention opposite the surface upon which is formed the patterned metal layer 12.

Upon forming the first two layer dielectric stack comprised of the first dielectric layer 14a and the second dielectric layer 14b, and the second two layer dielectric stack comprised of the third dielectric layer 16a and the fourth dielectric layer 16b, there is formed the low light reflectivity reticle of the third preferred embodiment of the present invention. The low light reflectivity reticle of the third preferred embodiment of the present invention attenuates or eliminates light reflected from both the side of the reticle upon which is formed the patterned metal layer 12 and the side of the reticle opposite the side of the reticle upon which is formed the patterned metal layer 12.

EXAMPLE

In order to ascertain the extent to which reflected light may be attenuated or eliminated from the surfaces of the reticles of the present invention, a computer simulation was undertaken. The computer simulation modeled transmitted and reflected light power as a function of thickness and index of refraction of dielectric layers formed upon a reticle within the context of the low light reflectivity reticles of the preferred embodiments of the present invention. The model employed conventional equations for the reflection of light from planar surfaces, as modified to accommodate the two-layer dielectric stacks of the low light reflectivity reticles of the preferred embodiments of the present invention.

As a specific example, a simulation was undertaken which modelled coherent light reflection from a reticle surface having formed thereupon a two-layer dielectric stack in accord with the first preferred embodiment of the present invention. The simulation assumed an index of refraction of the transparent substrate of 1.64, an index of refraction of the first dielectric layer of 2.10, an index of refraction of the second dielectric layer of 1.474, an index of refraction of air of 1.00, a thickness of the first dielectric layer of 190 angstroms, a thickness of the second dielectric layer of 750 angstroms and an incident light wavelength of 365 nanometers.

Figure 6:
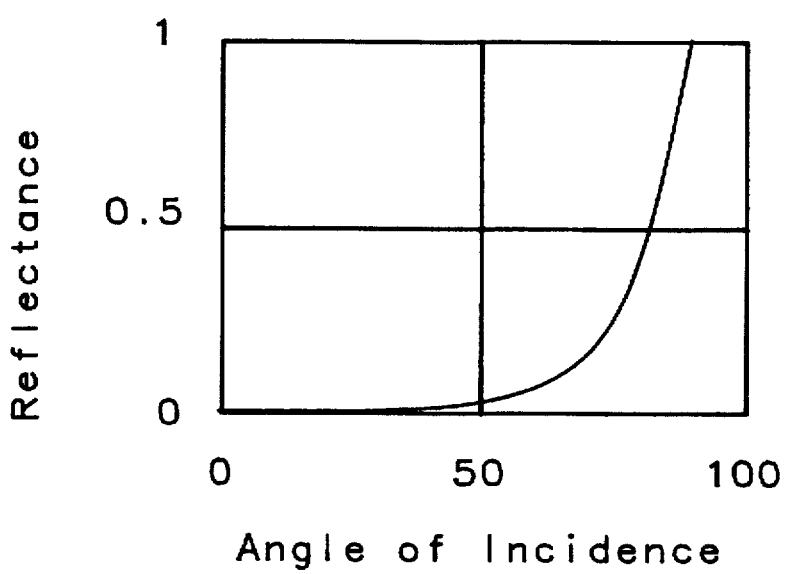
FIG. 6 shows a plot of Reflectance versus Angle of Incidence calculated for a reticle formed in accord with the first preferred embodiment of the present invention.

From the model there was calculated the transmittance and the reflectance of the 365 nanometer incident light as a function of angle of incidence of the light to the reticle. A plot of Transmittance versus Angle of Incidence so calculated is shown in FIG. 5. A plot of Reflectance versus Angle of Incidence so calculated is shown in FIG. 6. At a near normal angle of incidence (ie: zero), there was calculated about 100 percent transmittance and about 0.0012 percent reflectance of the 365 nanometer incident light through and from the reticle. For comparison purposes, an otherwise equivalent conventional reticle absent the two-layer dielectric stack of the present invention was calculated to have a reflectance of about 3.7 percent.

As is understood by a person skilled in the art, the preferred embodiments and example of the low light reflectivity reticle of the present invention are illustrative of the low light reflectivity reticle of the present invention rather than limiting of the low light reflectivity reticle of the present invention. Revisions may be made to the methods, materials and structures by which is formed the preferred embodiments and example of the low light reflectivity reticle of the present invention while still forming embodiments and examples which are within the spirit and scope of the low light reflectivity reticle of the present invention, as defined by the appended claims.

What is claimed is:

1. A method for forming a reticle comprising:

providing a transparent substrate, the transparent substrate having a first surface and a second surface, the first surface and the second surface being on opposite sides of the transparent substrate;

forming upon the first surface of the transparent substrate a patterned metal layer;

forming upon the second surface of the transparent substrate a two layer dielectric stack, the two layer dielectric stack having a first dielectric layer closer to the transparent substrate and a second dielectric layer formed directly upon the first dielectric layer, the first dielectric layer having an index of refraction greater than the index of refraction of either the transparent substrate or the second dielectric layer, the second dielectric layer having a thickness of about one-quarter a wavelength of light whose reflection is desired to be attenuated from the second surface.

2. The method of claim 1 wherein the transparent substrate is formed of a fused quartz glass having an index of refraction from about 1.6 to about 1.7.

3. The method of claim 1 wherein the first dielectric layer is formed from a silicon nitride having an index of refraction of about 2.0 to about 2.2.

4. The method of claim 3 wherein the thickness of the first dielectric layer is from about 170 to about 210 angstroms.

5. The method of claim 1 wherein the second dielectric layer is formed from a silicon oxide having an index of refraction of from about 1.4 to about 1.5.

6. The method of claim 5 wherein the second dielectric layer has a thickness of from about 700 to about 1100 angstroms when the reticle is exposed to a coherent light source at about 365 nm.

7. The method of claim 5 wherein the second dielectric layer has a thickness of from about 500 to about 750 angstroms when the reticle is exposed to a coherent light source at about 248 nm.

8. The method of claim 1 further comprising forming upon the first surface of the transparent substrate a second two layer dielectric stack, the second two layer dielectric stack having a first dielectric layer closer to the transparent substrate and a second dielectric layer formed directly upon the first dielectric layer, the first dielectric layer of the second two layer dielectric stack having an index of refraction greater than the index of refraction of either the transparent substrate or the second dielectric layer of the second two layer dielectric stack the second dielectric layer of the second layer dielectric stack having a thickness of about one-quarter a wavelength of light whose reflection is desired to be attenuated from the first surface.

9. A reticle comprising
a transparent substrate, the transparent substrate having a first surface and a second surface, the first surface and the second surface being on opposite sides of the transparent substrate;
a patterned metal layer formed upon the first surface of the transparent substrate;
a two-layer dielectric stack formed upon
the second surface of the transparent substrate, the two-layer dielectric stack having a first dielectric layer closer to the transparent substrate and a second dielectric layer formed directly upon the first dielectric layer, the first dielectric layer having an index of refraction greater than the index of refraction of either the transparent substrate or the second dielectric layer, the second dielectric layer having a thickness of about one-quarter a wavelength of light whose reflection is desired to be attenuated from the second surface.

10. The reticle of claim 9 wherein the transparent substrate is formed of a fused quartz glass having an index of refraction from about 1.6 to about 1.7.

11. The reticle of claim 9 wherein the first dielectric layer is formed from a silicon nitride having an index of refraction of about 2.0 to about 2.2.

12. The reticle of claim 11 wherein the thickness of the first dielectric layer is from about 170 to about 210 angstroms.

13. The reticle of claim 9 wherein the second dielectric layer is formed from a silicon oxide having an index of refraction of from about 1.4 to about 1.5.

14. The reticle of claim 13 wherein the second dielectric layer has a thickness of from about 700 to about 1100 angstroms when the reticle is exposed to a coherent light source at about 365 nm.

15. The reticle of claim 13 wherein the second dielectric layer has a thickness of from about 500 to about 750 angstroms when the reticle is exposed to a coherent light source at about 248 nm.

16. The reticle of claim 9 further comprising a second two layer dielectric stack formed upon the first surface of the transparent substrate, the second two layer dielectric stack having a first dielectric layer closer to the transparent substrate and a second dielectric layer formed directly upon the first dielectric layer, the first dielectric layer of the second two layer dielectric stack having an index of refraction greater than the index of refraction of either the transparent substrate or the second dielectric layer of the second two layer dielectric stack the second dielectric layer of the two layer dielectric stack having a thickness of about one-quarter a wavelength of light whose reflection is desired to be attenuated from the first surface.

* * * * *